(12) United States Patent
Schwaiger et al.

(10) Patent No.: US 9,482,412 B2
(45) Date of Patent: Nov. 1, 2016

(54) LIGHTING DEVICE

(71) Applicant: OSRAM GmbH, Munich (DE)

(72) Inventors: Stephan Schwaiger, Ulm (DE); Oliver Hering, Niederstotzingen (DE)

(73) Assignee: OSRAM GmbH, Munich (DE)

( * ) Notice: Subject to any disclaimer, the term of this patent is extended or adjusted under 35 U.S.C. 154(b) by 37 days.

(21) Appl. No.: 14/562,798

(22) Filed: Dec. 8, 2014

(65) Prior Publication Data

US 2015/0176811 A1    Jun. 25, 2015

(30) Foreign Application Priority Data

Dec. 19, 2013  (DE) .................. 10 2013 226 614

(51) Int. Cl.
| | |
|---|---|
| *F21V 9/16* | (2006.01) |
| *F21V 14/00* | (2006.01) |
| *F21K 99/00* | (2016.01) |
| *G02B 17/00* | (2006.01) |
| *F21S 8/10* | (2006.01) |
| *F21V 13/06* | (2006.01) |
| *F21Y 101/02* | (2006.01) |

(52) U.S. Cl.
CPC ................. *F21V 14/00* (2013.01); *F21K 9/56* (2013.01); *F21S 48/1145* (2013.01); *F21S 48/1742* (2013.01); *F21S 48/1757* (2013.01); *G02B 17/00* (2013.01); *F21V 13/06* (2013.01); *F21Y 2101/025* (2013.01)

(58) Field of Classification Search
CPC ...... F21V 14/00; F21V 13/06; F21V 13/045; F21K 9/56; F21K 9/58; G02B 17/00; F21S 48/1757; F21S 48/1145; F21S 48/1742; F21S 48/1715; F21S 48/1721; F21S 48/1752; F21Y 2101/025

USPC ................. 362/259, 260, 84; 359/226.1, 234
See application file for complete search history.

(56) References Cited

U.S. PATENT DOCUMENTS

| | | | |
|---|---|---|---|
| 5,561,544 A | 10/1996 | Macken | |
| 6,201,628 B1 * | 3/2001 | Basiji ...................... | G01J 3/443 250/458.1 |

(Continued)

FOREIGN PATENT DOCUMENTS

| | | |
|---|---|---|
| DE | 20320269 U1 | 5/2004 |
| DE | 102010028949 A1 | 11/2011 |
| DE | 102012205437 A1 | 10/2013 |

(Continued)

OTHER PUBLICATIONS

German Search Report dated Sep. 29, 2014.

*Primary Examiner* — Anh Mai
*Assistant Examiner* — Glenn Zimmerman (57) ABSTRACT

A lighting device may include a laser light source arrangement; an optical unit; at least one pivotable mirror; and at least one light wavelength conversion element. The optical unit and the at least one pivotable mirror are embodied in such a way that laser light generated by the laser light source arrangement is directed via the optical unit and the at least one pivotable mirror to the light wavelength conversion element. The lighting device may further include a unit configured to compensate for a lengthening or shortening—caused by the pivoting movement of the at least one pivotable mirror—of the optical path of the laser light generated by the laser light source arrangement and directed onto the at least one light wavelength conversion element via the optical unit and the at least one pivotable mirror.

10 Claims, 4 Drawing Sheets

(56) References Cited

U.S. PATENT DOCUMENTS

2007/0064239 A1* 3/2007 Fujita ................. G02B 21/0056
356/479
2013/0058114 A1 3/2013 Reiners

FOREIGN PATENT DOCUMENTS

| EP | 2537708 A2 | 12/2012 | |
| WO | 2013149766 A1 | 10/2013 | |
| WO | WO 2014205466 A1 * | 12/2014 | .......... F21S 48/1145 |

* cited by examiner

LIGHTING DEVICE

CROSS-REFERENCE TO RELATED APPLICATION

This application claims priority to German Patent Application Serial No. 10 2013 226 614.6, which was filed Dec. 19, 2013, and is incorporated herein by reference in its entirety.

TECHNICAL FIELD

Various embodiments relate generally to a lighting device.

BACKGROUND

Such a lighting device is disclosed in DE 10 2010 028 949 A1, for example. Said document describes a lighting device including a laser light source for generating blue light and at least one pivotable mirror and also at least one light wavelength conversion element. The blue light generated by the laser light source arrangement is directed onto the surface of the light wavelength conversion element with the aid of the pivotable mirror in order to generate white light which is a mixture of yellow light converted by means of the light wavelength conversion elements and non-converted blue light.

Figure 4:
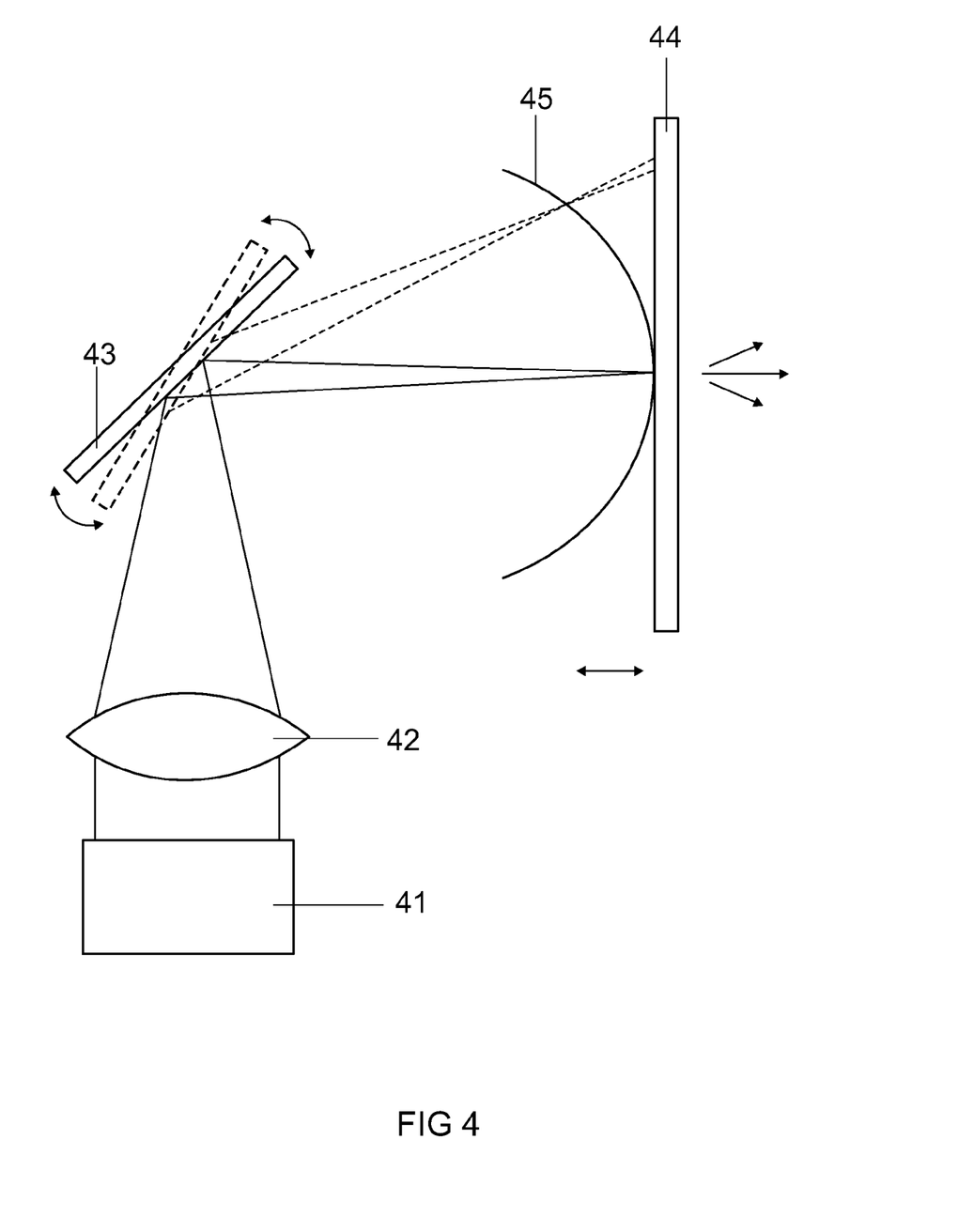
FIG. 4 shows a schematic illustration of a conventional lighting device.

FIG. 4 schematically illustrates such a conventional lighting device. The light which is generated by the laser light source 41 and collimated by a collimator lens (not depicted) is focused via the optical unit 42 and the pivotable mirror 43 onto the surface of the light wavelength conversion element 44. The mirror 43 is pivotable about two orthogonal pivoting axes which lie in the reflection surface of the mirror 43 and intersect at the area centroid of the reflection surface of the mirror 43. The laser light beam impinges on the reflection surface of the mirror 43 in the region of the area centroid and is deflected in the direction of the light wavelength conversion element 44. The optical unit 42, the pivotable mirror 43 and the light wavelength conversion element 44 are arranged and aligned in such a way that the laser light beam in the case of a non-deflected mirror 43, that is to say in the case of a pivoting angle of zero degrees, corresponding to the rest position of the mirror 43, is concentrated onto the surface of the light wavelength conversion element 44 centrally and with a minimal laser spot diameter. The focal point of the optical unit 42 lies on the surface of the light wavelength conversion element 44 after imaging by the mirror 43 in the case of a pivoting angle of zero degrees. FIG. 4 illustrates this state of the mirror 43 with the aid of solid lines. Moreover, with the aid of dashed lines, FIG. 4 schematically illustrates a second pivoting state of the mirror 43, which corresponds to the deflection of the mirror 43 from its rest position by an angle of greater than zero degrees. As a result of the deflection of the mirror 43 from its rest position, the focal point of the optical unit 42 migrates after imaging by the mirror 43 along the surface 45 of a sphere whose midpoint lies at the intersection point of the two pivoting axes of the mirror 43, such that the optical path for the laser light beam generated by the laser light source arrangement 41 and directed onto the light wavelength conversion element 44 by optical unit 42 and mirror 43 is lengthened. As a result, the laser light beam after deflection by the mirror 43 arranged in the pivoting position deviating from the rest position, upon impinging on the surface of the light wavelength conversion element 44, has a larger laser spot diameter than the laser light beam after deflection by the mirror 43 arranged in its rest position. The conventional lighting device therefore has the disadvantage that the diameter of the laser spot of the laser light beam impinging on the surface of the light wavelength conversion element depends on the pivoting angle of the pivotable mirror.

SUMMARY

A lighting device may include a laser light source arrangement; an optical unit; at least one pivotable mirror; and at least one light wavelength conversion element. The optical unit and the at least one pivotable mirror are embodied in such a way that laser light generated by the laser light source arrangement is directed via the optical unit and the at least one pivotable mirror to the light wavelength conversion element. The lighting device may further include a unit configured to compensate for a lengthening or shortening—caused by the pivoting movement of the at least one pivotable mirror—of the optical path of the laser light generated by the laser light source arrangement and directed onto the at least one light wavelength conversion element via the optical unit and the at least one pivotable mirror.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a lighting device which enables a laser spot on the light wavelength conversion element whose diameter is largely independent of the pivoting movement of the pivotable mirror or whose value can be set in a manner dependent on the pivoting position of the pivotable mirror.

The lighting device according to various embodiments may include a laser light source, an optical unit and at least one pivotable mirror and also at least one light wavelength conversion element, wherein the optical unit and the at least one pivotable mirror are embodied in such a way that light generated by the laser light source arrangement is directed via the optical unit and the at least one pivotable mirror to the light wavelength conversion element. According to various embodiments, provision is made of units configured to compensate for a lengthening or shortening—caused by the pivoting movement of the at least one pivotable mirror—of the optical path of the laser light generated by the laser light source arrangement and directed onto the at least one light wavelength conversion element via the optical unit and via the at least one pivotable mirror.

It can thereby be ensured that the diameter of the laser spot impinging on the at least one light wavelength conversion element is independent of the angle of incidence of the laser light beam which impinges on the at least one pivotable mirror and which is directed in the direction of the at least one light wavelength conversion element.

In a first embodiment of the lighting device, the unit configured to compensate for a lengthening or shortening—caused by the pivoting movement of the at least one pivotable mirror—of the optical path of the laser light generated by the laser light source arrangement and directed onto the at least one light wavelength conversion element via the optical unit and via the at least one pivotable mirror may include an apparatus for varying the distance between the optical unit or the laser light source arrangement and the at least one pivotable mirror. In various embodiments, in the case of the lighting device in accordance with the first embodiment, the laser light generated by the laser light source arrangement is guided onto the optical unit after collimation by collimator lenses and the distance between optical unit and pivotable mirror is varied in a manner dependent on the pivoting position of the mirror. Alternatively, in the case of dispensing with collimation of the light generated by the laser light source arrangement, instead of or in addition to the apparatus for varying the distance between the optical unit and the pivotable mirror, provision can be made of an apparatus for varying the distance between the laser light source arrangement and the pivotable mirror in a manner dependent on the pivoting position of the mirror.

In a second embodiment of the lighting device, the unit configured to compensate for a lengthening or shortening—caused by the pivoting movement of the at least one pivotable mirror—of the optical path of the laser light generated by the laser light source arrangement and directed onto the at least one light wavelength conversion element via the optical unit and via the at least one pivotable mirror may include an apparatus for varying the optical properties of the optical unit in a manner dependent on the pivoting position of the at least one pivotable mirror.

In a third embodiment of the lighting device, the unit configured to compensate for a lengthening or shortening—caused by the pivoting movement of the at least one pivotable mirror—of the optical path of the laser light generated by the laser light source arrangement and directed onto the at least one light wavelength conversion element via the optical unit and via the at least one pivotable mirror may include an apparatus for varying the distance between the at least one pivotable mirror and the at least one light wavelength conversion element.

The distance between the at least one pivotable mirror and the optical unit or the at least one light wavelength conversion element is defined as the shortest distance between the area centroid of the reflection surface of the at least one pivotable mirror and the optical unit or the at least one light wavelength conversion element. The pivoting axis or the pivoting axes of the at least one pivotable mirror may run through the area centroid of its reflection surface, such that the pivoting movement of the at least one mirror does not bring about a change in distance between the mirror and the optical unit or the mirror and the at least one light wavelength conversion element.

All three alternative embodiments of the lighting device as mentioned above enable a compensation of the lengthening or shortening—caused by the pivoting movement of the at least one pivotable mirror—of the optical path of the laser light beam directed onto the at least one light wavelength conversion element.

The lighting device in accordance with the first embodiment may have a controller configured to regulate the distance between the optical unit and the at least one pivotable mirror synchronously with the pivoting movement of the at least one pivotable mirror. Distance regulation and pivoting movement can be synchronized by the controller, such that the optical path of the laser light which is generated by the laser light source arrangement and which is directed onto the at least one light wavelength conversion element is independent of the pivoting position of the at least one pivotable mirror. In various embodiments, in the case of a lengthening of the optical path of the abovementioned laser light which is caused by a deflection of the at least one pivotable mirror from its rest position by a specific pivoting angle, the abovementioned lengthening of the optical path of the laser light can be compensated for by a reduction of the distance between the at least one pivotable mirror and the optical unit, said reduction being adapted to the pivoting angle.

The lighting device in accordance with the second embodiment may have a controller configured to regulate the focal length of the optical unit synchronously with the pivoting movement of the at least one pivotable mirror, in order to adapt the length of the optical path of the laser light in a manner corresponding to the pivoting angle of the at least one pivotable mirror, such that the length of the optical path of the laser light is independent of the pivoting angle of the at least one pivotable mirror.

The lighting device in accordance with the third embodiment may have a controller configured to regulate the distance between the at least one pivotable mirror and the at least one light wavelength conversion element synchronously with the pivoting movement of the at least one pivotable mirror. Distance regulation and pivoting movement can be synchronized by the controller, such that the optical path of the laser light which is generated by the laser light source arrangement and which is directed onto the at least one light wavelength conversion element is independent of the pivoting position of the at least one pivotable mirror.

In various embodiments, the at least one pivotable mirror of the lighting device is embodied as a micromirror, e.g. as a Micro Electro Mechanical Systems mirror (MEMS mirror), and may be embodied as pivotable about two mutually orthogonal pivoting axes. As a result, the surface of the at least one light wavelength conversion element can be scanned with the laser light reflected at the at least one pivotable mirror. In various embodiments, the laser light reflected at the at least one pivotable mirror can be guided for example line by line and column by column over the surface of the at least one light wavelength conversion element in order to excite the at least one light wavelength conversion element for emission of secondary light.

The laser light source arrangement of the lighting device may be embodied in such a way that it generates laser light having wavelengths from the wavelength range of 380 nanometers to 490 nanometers, and the at least one light wavelength conversion element may be embodied in such a way that it converts light having wavelengths from the wavelength range of 380 nanometers to 490 nanometers proportionally into light having an intensity maximum in the wavelength range of 520 nanometers to 590 nanometers. As a result, by means of the at least one laser light source arrangement and by the at least one light wavelength conversion element, white light is generated which is a mixture of non-converted blue laser light and yellow light converted at the light wavelength conversion element and which can be used in a motor vehicle headlight or other projection apparatuses.

Figure 1:
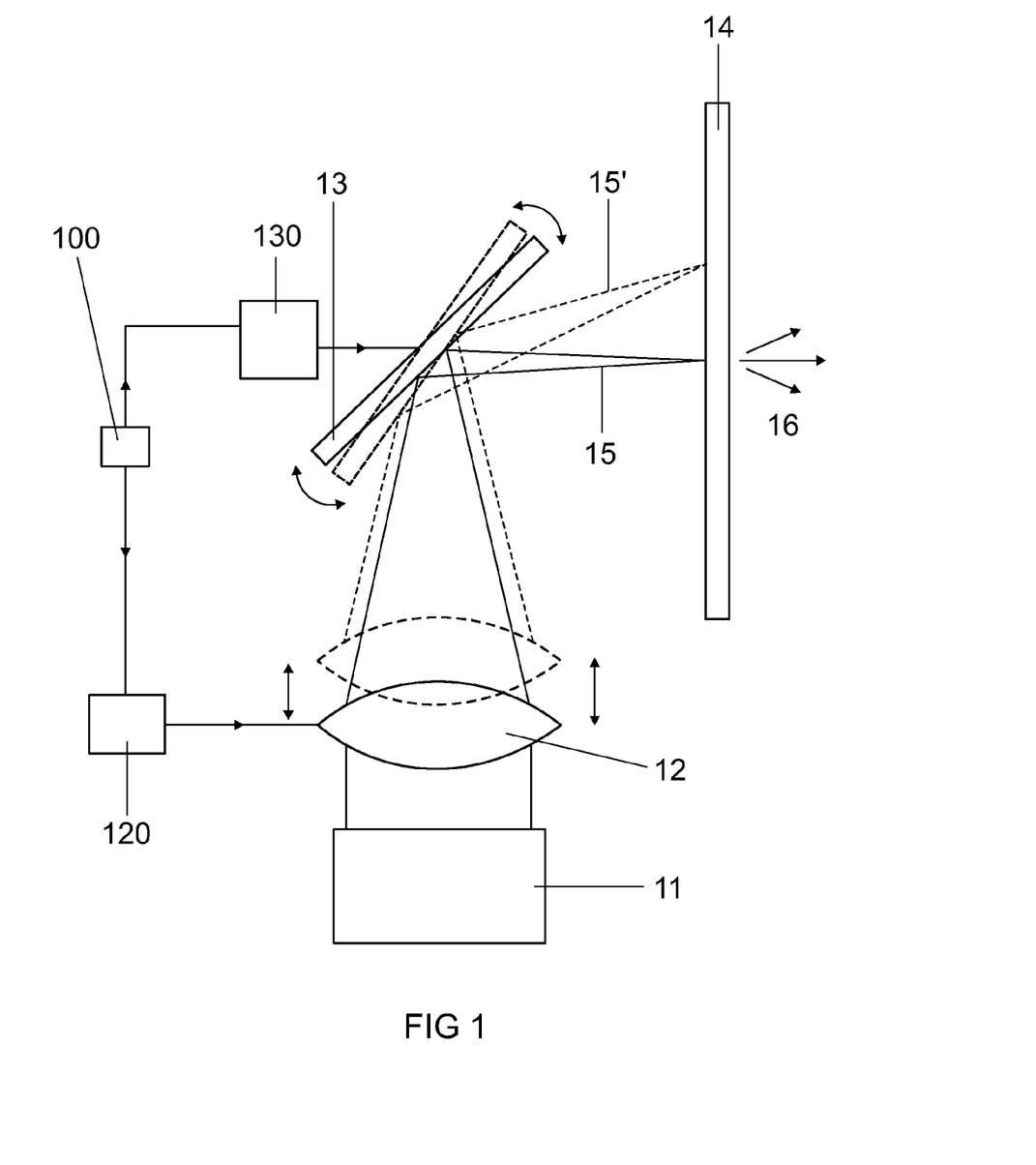
FIG. 1 shows a schematic illustration of the lighting device in accordance with the first embodiment.

FIG. 1 schematically depicts the lighting device in accordance with the first embodiment.

This lighting device has a laser light source arrangement 11, a movable beam shaping optical unit 12 with movement apparatus 120, a pivotable mirror 13 with pivoting apparatus 130 and a light wavelength conversion element 14 and also a controller 100 for the movement apparatus 120 and the pivoting apparatus 130.

The laser light source arrangement 11 consists of a plurality of laser diodes of identical type, which each emit laser light having a wavelength from the wavelength range of 380 nanometers to 490 nanometers and e.g. having a wavelength of 450 nanometers during their operation, and of collimator lenses (not depicted) and also of a TIR optical unit (not depicted), which combines the laser light emitted by the laser diodes to form a common laser light beam with very low divergence. The laser light source arrangement 11 therefore emits collimated blue laser light which is directed onto the reflection surface of the pivotable mirror 13 by the beam shaping optical unit 12.

By the beam shaping optical unit 12, the light emitted by the laser light source arrangement 11 is concentrated and directed onto the area centroid of the reflection surface of the pivotable mirror 13. The beam shaping optical unit 12 consists of an optical lens or a system of a plurality of optical lenses. The distance between the beam shaping optical unit 12 and the pivotable mirror 13 is regulated in a manner dependent on the pivoting angle of the pivotable mirror 13 by the movement apparatus 120 and the controller 100. In the case of a pivoting angle of zero degrees of the mirror 13, the distance between the beam shaping optical unit 12 and the pivotable mirror 13 is set in such a way that the sum of the distance between beam shaping optical unit 12 and mirror 13 and the distance between mirror 13 and light wavelength conversion element 14 corresponds to the focal length of the beam shaping optical unit 12. The distance between mirror 13 and beam shaping optical unit 12 and between mirror 13 and light wavelength conversion element 14 is measured in each case from the area centroid of the reflection surface of the mirror 13. It denotes in each case the shortest distance from the area centroid of the reflection surface of the mirror 13 to the beam shaping optical unit 12, and to the light wavelength conversion element 14. The distance generally does not correspond to the "path length"

of the laser light beam between optical unit 12 and light wavelength conversion element 14.

The pivotable mirror 13 is embodied as a micromirror, e.g. as a Micro Electro Mechanical Systems micromirror, also called MEMS micromirror, and is pivotable about two pivoting axes, wherein a first pivoting axis is oriented perpendicularly to the plane of the drawing in the case of the illustration in FIG. 1 and the second pivoting axis lies in the plane of the drawing. The two pivoting axes (not depicted) are arranged in the reflection surface of the mirror 13 and intersect at the area centroid of the reflection surface of the mirror 13. The pivoting movement of the mirror 13 about the two pivoting axes is effected by means of the pivoting apparatus 130. The mirror 13 is deflected from its rest position in the horizontal about the first pivoting axis by angles from a first angle range of $\pm\alpha_{max}$ and is deflected from its rest position in the vertical about the second pivoting axis by angles from a second angle range of $\pm\beta_{max}$, in order to scan the surface of the light wavelength conversion element 14 line by line and column by column.

The light wavelength conversion element 14 consists of a light-transmissive sapphire lamina coated with phosphor, wherein cerium-doped yttrium aluminum garnet (YAG:Ce) is used as the phosphor. The phosphor is excited by means of the laser light emitted by the laser light source arrangement 11. It converts the laser light, also called primary light, proportionally into secondary light having a longer wavelength, which has an intensity maximum in the wavelength range of 520 nanometers to 590 nanometers. The light wavelength conversion element 14 therefore emits white light 16 which is a mixture of non-converted blue primary light and converted yellow secondary light. The phosphor particles have a light-scattering effect, such that the secondary light generated by the light wavelength conversion element 14 has a virtually Lambertian light distribution. The area of the sapphire lamina coated with phosphor has a size in the range of 0.5 mm$^2$ to 500 mm$^2$, such that the light wavelength conversion element 14 itself can be used as a white light source for a motor vehicle headlight or some other projection application.

The movement apparatus 120 and the pivoting apparatus 130 are embodied for example as servo motors or as piezoelectric elements, the movements and oscillations of which are synchronized with the aid of the controller 100, such that as the pivoting angle of the mirror 13 about its pivoting axes increases, the distance between the beam shaping optical unit 12 and the mirror 13 is reduced, in such a way that the diameter of the laser spot of the laser light beam on the light wavelength conversion element 14 is independent of the pivoting position of the mirror 13.

For elucidation FIG. 1 schematically illustrates the beam path of the laser light beam emitted by the laser light source arrangement for two different pivoting angles of the mirror 13 and two correspondingly adapted positions of the beam shaping optical unit 12. With the aid of solid lines, FIG. 1 illustrates the rest position of the mirror 13, which corresponds to a pivoting angle of in each case zero degrees about both pivoting axes. In this position of the mirror 13, the laser light beam 15 is focused for example centrally onto the surface of the light wavelength conversion element 14. The sum of the distance between beam shaping optical unit 12 and mirror 13 and the distance between mirror 13 and light wavelength conversion element 14 in this case corresponds to the focal length of the beam shaping optical unit 12, such that a laser light beam with a minimal laser spot diameter is shaped centrally on the surface of the light wavelength conversion element 14.

With the aid of dashed lines, FIG. 1 schematically illustrates a second pivoting position of the mirror 13, this pivoting position being different than the rest position. In this position of the mirror 13, the laser light beam 15' is focused eccentrically onto the surface of the light wavelength conversion element 14. In order to compensate for the lengthening of the optical path of the laser light beam 15', said lengthening being described above in association with FIG. 4 and being caused by the deflection of the mirror 13 from its rest position, the distance between the beam shaping optical unit 12 and the mirror 13 is correspondingly regulated synchronously with the pivoting movement of the mirror 13, such that the minimal laser spot diameter of the laser light beam on the light wavelength conversion element 14 is maintained independently of the pivoting angle of the mirror 13.

In various embodiments, with increasing deflection of the mirror from its rest position, irrespective of whether this occurs with a positive or negative sign and irrespective of the pivoting axis about which this occurs, the distance between the beam shaping optical unit and the mirror is correspondingly reduced in order to compensate for a lengthening of the optical path of the laser light beam caused by the deflection of the mirror 13.

Alternatively, in the case of the lighting device in accordance with the first embodiment, the laser light source arrangement 11 can be embodied in such a way that it generates a non-collimated laser light beam that is directed onto the pivotable mirror 13 by the beam shaping optical unit 12. In this case, in addition or as an alternative to the beam shaping optical unit 12, the laser light source arrangement 11 is arranged movably relative to the pivotable mirror 13 and the apparatus 120 is embodied in such a way that with the aid thereof the distance between the pivotable mirror 13 and the laser light source arrangement 11 is variable in addition or as an alternative to the distance between the pivotable mirror 13 and the beam shaping optical unit 12.

Figure 2:
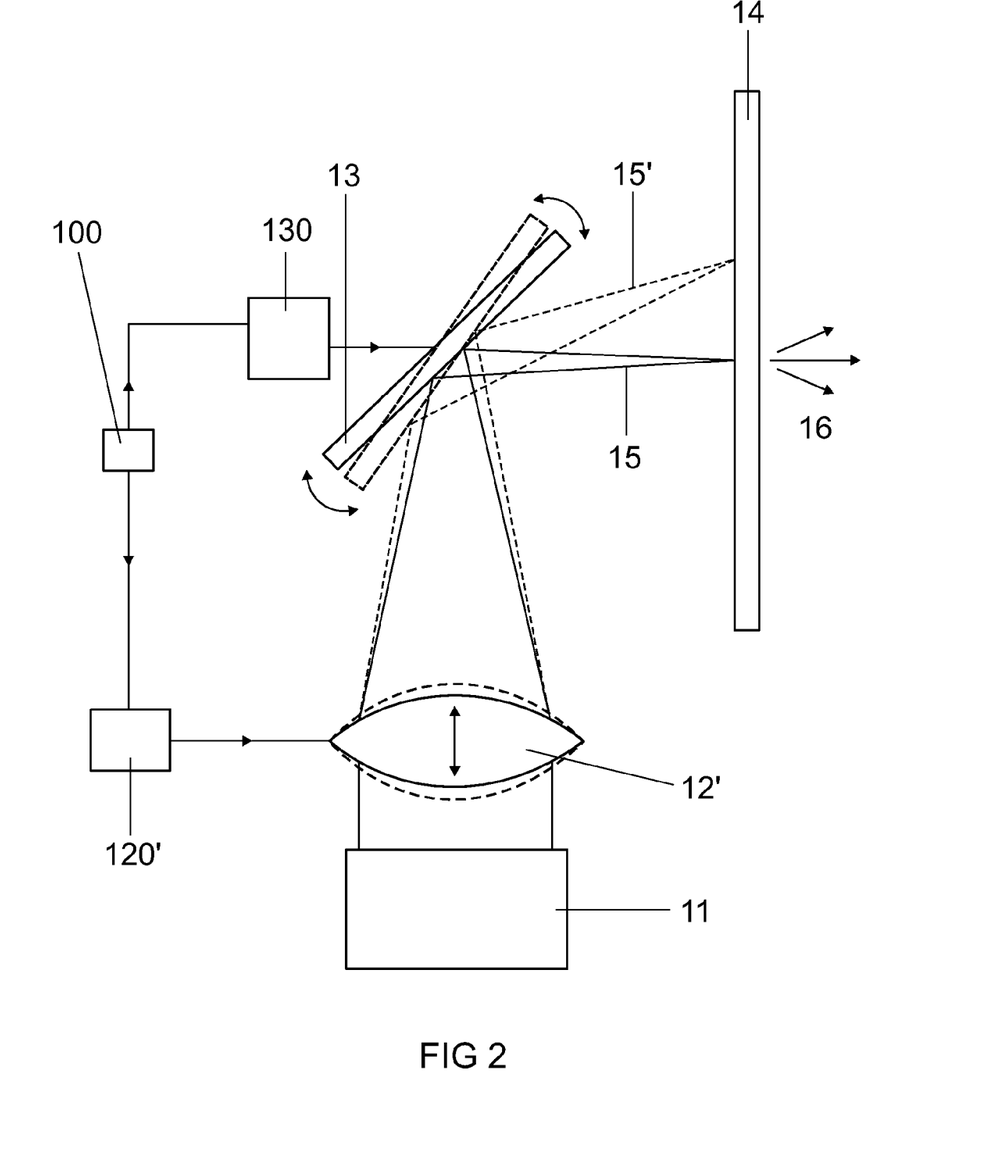
FIG. 2 shows a schematic illustration of the lighting device in accordance with the second embodiment.

FIG. 2 schematically depicts the lighting device in accordance with the second embodiment. The lighting device in accordance with the second embodiment differs from the lighting device in accordance with the first embodiment only in the different embodiment of the beam shaping optical unit 12'. The lighting devices in accordance with the first and second embodiments correspond in all other details. Therefore, in FIG. 1 and FIG. 2 identical reference signs are used for the same components of the lighting devices and, for the description thereof, reference is made to the description of the lighting device in accordance with the first embodiment. Therefore, only the differences in the case of the lighting device in accordance with the second embodiment are explained in greater detail below.

In the case of the lighting device in accordance with the second embodiment, the beam shaping optical unit 12' consists of an optical lens or an optical lens system, the optical properties of which are variable by an actuating apparatus 120'. By way of example, the beam shaping optical unit 12' is an optical lens which consists of flexible, transparent material and the shape of which can be changed by pressure being exerted by the actuating apparatus, such that the focal length of the beam shaping optical unit 12' is variable. Alternatively, the beam shaping optical unit 12' can be embodied as an optical lens system whose focal length is variable by the actuating apparatus 120'.

For elucidation FIG. 2 schematically illustrates the beam path of the laser light beam emitted by the laser light source arrangement 11 for two different pivoting angles of the mirror 13 and two correspondingly adapted focal lengths of the beam shaping optical unit 12'. With the aid of solid lines, FIG. 2 illustrates the rest position of the mirror 13, which corresponds to a pivoting angle of in each case zero degrees about both pivoting axes. In this position of the mirror 13, the laser light beam 15 is focused centrally onto the surface of the light wavelength conversion element 14.

With the aid of dashed lines, FIG. 2 schematically illustrates a second pivoting position of the mirror 13, this pivoting position being different than the rest position. In this position of the mirror 13, the laser light beam 15' is focused eccentrically onto the surface of the light wavelength conversion element 14. In order to compensate for the lengthening of the optical path of the laser light beam 15', said lengthening being described above in association with FIG. 4 and being caused by the deflection of the mirror 13 from its rest position, the focal length of the beam shaping optical unit 12 is correspondingly regulated synchronously with the pivoting movement of the mirror 13, such that the minimal laser spot diameter of the laser light beam on the light wavelength conversion element 14 is maintained independently of the pivoting angle of the mirror 13. In various embodiments, with increasing deflection of the mirror from its rest position, irrespective of whether this occurs with a positive or negative sign and irrespective of the pivoting axis about which this occurs, the focal length of the beam shaping optical unit 12' is increased in order to compensate for a lengthening of the optical path of the laser light beam caused by the deflection of the mirror 13. The regulation of the focal length of the beam shaping optical unit 12' is adapted to the pivoting movement of the mirror 13 by the controller 100.

Figure 3:
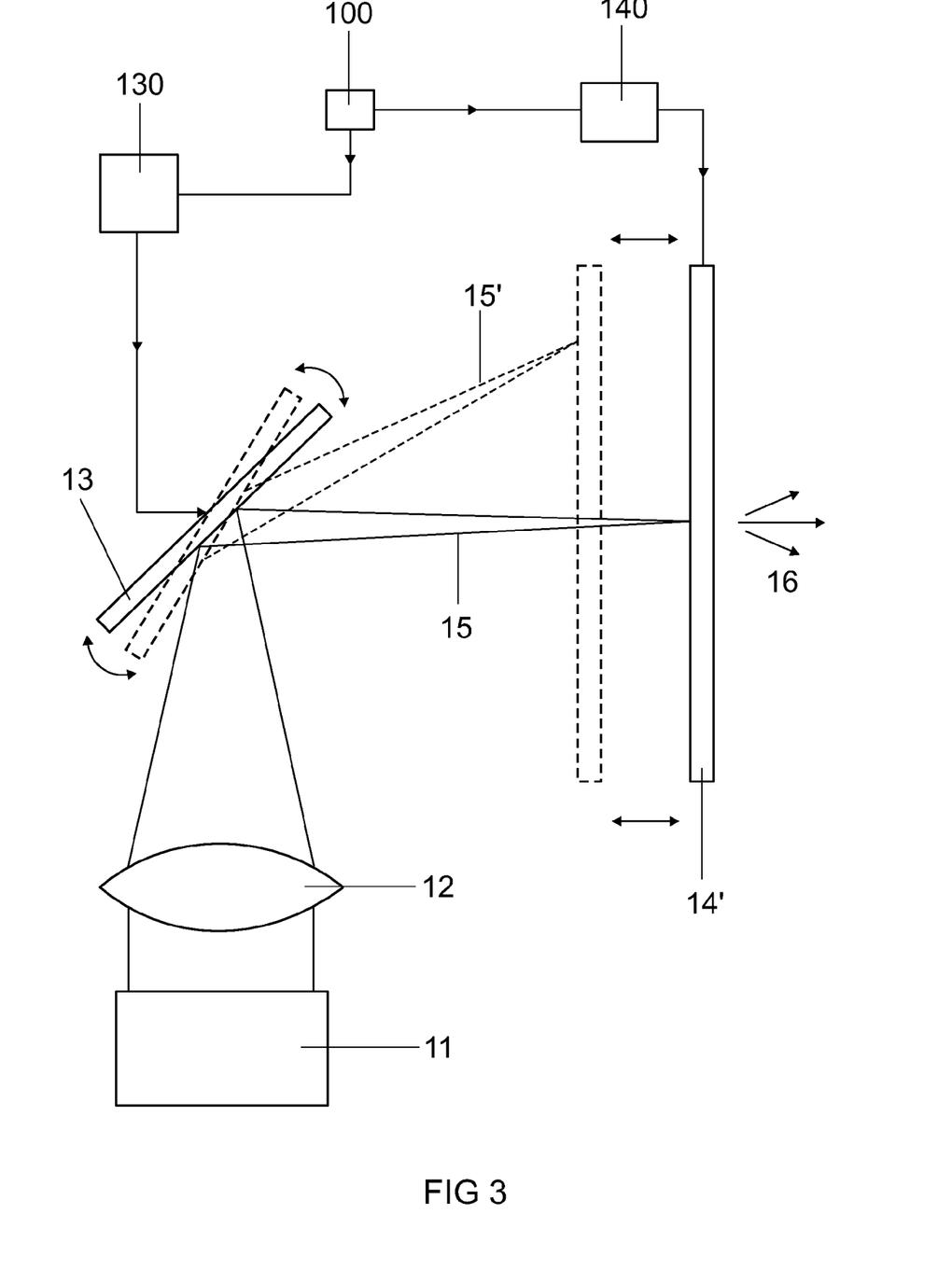
FIG. 3 shows a schematic illustration of the lighting device in accordance with the third embodiment.

FIG. 3 schematically depicts the lighting device in accordance with the third embodiment. The lighting device in accordance with the third embodiment differs from the lighting device in accordance with the first embodiment only in the different embodiment of the light wavelength conversion element 14' and its movement apparatus 140. The lighting devices in accordance with the first and third embodiments correspond in all other details. Therefore, in FIG. 1 and FIG. 3 identical reference signs are used for the same components of the lighting devices and, for the description thereof, reference is made to the description of the lighting device in accordance with the first embodiment. Therefore, only the differences in the case of the lighting device in accordance with the third embodiment are explained in greater detail below.

The light wavelength conversion element 14' consists of a light-transmissive sapphire lamina coated with phosphor, wherein cerium-doped yttrium aluminum garnet (YAG:Ce) is used as the phosphor. The phosphor is excited by the laser light emitted by the laser light source arrangement 11. It converts the laser light, also called primary light, proportionally into secondary light having a longer wavelength, which has an intensity maximum in the wavelength range of 520 nanometers to 590 nanometers. The light wavelength conversion element 14' therefore emits white light 16 which is a mixture of non-converted blue primary light and converted yellow secondary light. The phosphor particles have a light-scattering effect, such that the secondary light generated by the light wavelength conversion element 14' has a virtually Lambertian light distribution. The area of the sapphire lamina coated with phosphor has a size in the range of 0.5 mm$^2$ to 500 mm$^2$, such that the light wavelength conversion element 14' itself can be used as a white light source for a motor vehicle headlight or some other projection application. The light wavelength conversion element 14' is arranged movably in relation to the mirror 13. In various embodiments, the distance between the light wavelength conversion element 14' and the mirror 13 can be varied by the movement apparatus 140. The movement apparatus 140 is embodied for example as a piezoelectric element or servo motor, the oscillation or movement of which is synchronized with the oscillation or movement of the pivoting apparatus 130 of the mirror 13 by means of the controller 100. In various embodiments, in addition to the light wavelength conversion element 14', a secondary optical unit (not depicted) disposed downstream of the light wavelength conversion element 14' is moved jointly with the light wavelength conversion element 14'. The secondary optical unit is, for example, part of a motor vehicle headlight and serves for imaging the light distribution generated at the light wavelength conversion element 14' onto the roadway in front of the motor vehicle.

For elucidation FIG. 3 schematically illustrates the beam path of the laser light beam emitted by the laser light source arrangement 11 for two different pivoting angles of the mirror 13 and two correspondingly adapted positions of the light wavelength conversion element 14'. With the aid of solid lines, FIG. 3 illustrates the rest position of the mirror 13, which corresponds to a pivoting angle of in each case zero degrees about both pivoting axes. In this position of the mirror 13, the laser light beam 15 is focused centrally onto the surface of the light wavelength conversion element 14'.

With the aid of dashed lines, FIG. 3 schematically illustrates a second pivoting position of the mirror 13, this pivoting position being different than the rest position. In this position of the mirror 13, the laser light beam 15' is focused eccentrically onto the surface of the light wavelength conversion element 14'. In order to compensate for the lengthening of the optical path of the laser light beam 15', said lengthening being described above in association with FIG. 4 and being caused by the deflection of the mirror 13 from its rest position, the distance between the light wavelength conversion element 14' and the mirror 13 is correspondingly regulated synchronously with the pivoting movement of the mirror 13, such that the minimal laser spot diameter of the laser light beam on the light wavelength conversion element 14' is maintained independently of the pivoting angle of the mirror 13. In various embodiments, with increasing deflection of the mirror 13 from its rest position, irrespective of whether this occurs with a positive or negative sign and irrespective of the pivoting axis about which this occurs, the distance between the light wavelength conversion element 14' and the mirror 13 is correspondingly reduced in order to compensate for a lengthening of the optical path of the laser light beam 15' caused by the deflection of the mirror 13.

The embodiments are not restricted to the embodiments explained in greater detail above. By way of example, the pivotable mirror 13 can be replaced by a sequence of two mirrors which are each pivotable only about one pivoting axis, wherein the pivoting axes of both mirrors are arranged orthogonally to one another. Furthermore, individual components of the three embodiments can also be combined with one another. By way of example, it is possible for both the light wavelength conversion element and the beam shaping optical unit and the laser light source arrangement to be embodied in a movable fashion or additionally for the focal length of the beam shaping optical unit to be embodied as variable. The light wavelength conversion element 14 and 14' of the lighting devices in accordance with the embodiments explained in greater detail above is operated in transmission. Alternatively, however, the light wavelength conversion element 14 and 14' can also be operated in reflection by virtue of, for example, that side of the light wavelength conversion element 14 and 14' which faces away from the pivotable mirror 13 being embodied in a light-reflecting fashion.

Furthermore, the apparatuses 100, 120, 120', 130 and 140 can be embodied in such a way that, with the aid thereof, the corresponding distances between mirror 13 and beam shaping optical unit 12 or light wavelength conversion element 14' or the focal length of the beam shaping optical unit 12' are/is varied in a manner dependent on the pivoting position of the mirror 13 in such a way that the diameter of the laser spot on the light wavelength conversion element 14 and 14' assumes predefinable values which can be dependent on the pivoting position of the mirror 13 and can vary in a predefinable manner depending on the pivoting position of the mirror 13. The regulation of the abovementioned distances or of the focal length of the beam shaping optical unit 12' therefore need not necessarily be aimed at minimal size of the laser spot diameter on the light wavelength conversion element 14 and 14'.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device, comprising:
   a laser light source arrangement;
   an optical unit;
   at least one pivotable mirror; and
   at least one light wavelength conversion element;
   wherein the optical unit and the at least one pivotable mirror are embodied in such a way that laser light generated by the laser light source arrangement is directed via the optical unit and the at least one pivotable mirror to the light wavelength conversion element; and
   a unit configured to compensate for a lengthening or shortening—caused by the pivoting movement of the at least one pivotable mirror—of the optical path of the laser light generated by the laser light source arrangement and directed onto the at least one light wavelength conversion element via the optical unit and the at least one pivotable mirror.

2. The lighting device of claim 1,
   wherein the unit configured to compensate for a lengthening or shortening comprises an apparatus configured to vary the distance between the optical unit and the at least one pivotable mirror in a manner dependent on the pivoting position of the at least one pivotable mirror.

3. The lighting device of claim 1,
   wherein the unit configured to compensate for a lengthening or shortening comprises an apparatus configured to vary the distance between the laser light source arrangement and the at least one pivotable mirror in a manner dependent on the pivoting position of the at least one pivotable mirror.

4. The lighting device of claim 1,
   wherein the unit configured to compensate for a lengthening or shortening comprises an apparatus configured to vary the optical properties of the optical unit in a manner dependent on the pivoting position of the at least one pivotable mirror.

5. The lighting device of claim 1,
wherein the unit configured to compensate for a lengthening or shortening comprises an apparatus configured to vary the distance between the at least one pivotable mirror and the at least one light wavelength conversion element in a manner dependent on the pivoting position of the at least one pivotable mirror.

6. The lighting device of claim 1, further comprising:
a controller configured to regulate the distance between the optical unit and the at least one pivotable mirror synchronously with the pivoting movement of the mirror.

7. The lighting device of claim 1, further comprising:
a controller configured to regulate the focal length of the optical unit synchronously with the pivoting movement of the at least one pivotable mirror.

8. The lighting device of claim 1, further comprising:
a controller configured to regulate the distance between the at least one pivotable mirror and the at least one light wavelength conversion element synchronously with the pivoting movement of the at least one pivotable mirror.

9. The lighting device of claim 1,
wherein the at least one pivotable mirror is embodied as a Micro Electro Mechanical Systems mirror (MEMS mirror).

10. The lighting device of claim 1,
wherein the laser light source arrangement is configured to generate light having wavelengths from the wavelength range of 380 nanometers to 490 nanometers, and the at least one light wavelength conversion element is embodied in such a way that it converts light having wavelengths from the wavelength range of 380 nanometers to 490 nanometers proportionally into light having an intensity maximum in the wavelength range of 520 nanometers to 590 nanometers.

* * * * *